(12) United States Patent
Eriksen et al.

(10) Patent No.: US 10,513,245 B2
(45) Date of Patent: Dec. 24, 2019

(54) SECURE KEY ACKNOWLEDGEMENT—FREQUENCY DILUTION

(71) Applicant: FELL Technology AS, Drammen (NO)

(72) Inventors: Fredrik Eriksen, Oslo (NO); Christian Frost Røine, Drammen (NO)

(73) Assignee: Fell Technology AS, Drammen (NO)

( * ) Notice: Subject to any disclaimer, the term of this patent is extended or adjusted under 35 U.S.C. 154(b) by 0 days.

(21) Appl. No.: 16/273,710

(22) Filed: Feb. 12, 2019

(65) Prior Publication Data

US 2019/0248328 A1 Aug. 15, 2019

Related U.S. Application Data

(60) Provisional application No. 62/629,225, filed on Feb. 12, 2018, provisional application No. 62/629,234, (Continued)

(51) Int. Cl.
*B60R 25/24* (2013.01)
*H04L 12/40* (2006.01)
(Continued)

(52) U.S. Cl.
CPC .............. *B60R 25/24* (2013.01); *B60R 25/04* (2013.01); *B60R 25/209* (2013.01); *B60R 25/23* (2013.01);
(Continued)

(58) Field of Classification Search
CPC ............ G07C 9/00174; G07C 9/00309; G07C 9/00857; G07C 2009/00388;
(Continued)

(56) References Cited

U.S. PATENT DOCUMENTS 3,786,892 A 1/1974 Horton
3,889,089 A 6/1975 Tomlin
(Continued)

FOREIGN PATENT DOCUMENTS

GB 2286247 1/1995
WO 9735738 3/1997
WO WO2017035590 3/2017

OTHER PUBLICATIONS

International Search Report and Written Opinion dated May 8, 2019 in Application No. PCT/EP2019/053456.
(Continued)

*Primary Examiner* — Andrew W Bee
(74) *Attorney, Agent, or Firm* — AWA Sweden AB; Thomas L. Ewing

(57) ABSTRACT

An embodiment of the invention provides a system for securely establishing a connection between a key and a receiver within or connected to, a vehicle such as, but not limited to, a car/motorized vehicle, a boat/vessel or a house. The key establishes contact to the receiver by sending a radio transmission. The receiver will respond, upon receipt of incoming transmission, with a message containing a pattern of multiple (2 or more) frequencies the key must transmit information on sequentially to allow for the receiver to do certain actions based on information transmitted by the key such as, but not limited to, turning on ignition, starting engine, switching relays.

16 Claims, 2 Drawing Sheets

Related U.S. Application Data filed on Feb. 12, 2018, provisional application No. 62/629,239, filed on Feb. 12, 2018.

(51) Int. Cl.
| | |
|---|---|
| *B60R 25/20* | (2013.01) |
| *B60R 25/23* | (2013.01) |
| *B60R 25/31* | (2013.01) |
| *H04W 4/44* | (2018.01) |
| *H04W 12/08* | (2009.01) |
| *G07C 9/00* | (2006.01) |
| *B60R 25/04* | (2013.01) |
| *H04W 4/38* | (2018.01) |
| *H04W 76/15* | (2018.01) |
| *B63H 21/21* | (2006.01) |
| *H04W 84/18* | (2009.01) |

(52) U.S. Cl.
CPC .......... *B60R 25/31* (2013.01); *G07C 9/00174* (2013.01); *G07C 9/00309* (2013.01); *G07C 9/00857* (2013.01); *H04L 12/40* (2013.01); *H04W 4/38* (2018.02); *H04W 4/44* (2018.02); *H04W 12/0802* (2019.01); *H04W 76/15* (2018.02); *B60R 2325/101* (2013.01); *B60R 2325/108* (2013.01); *B60R 2325/205* (2013.01); *B63H 2021/216* (2013.01); *G07C 2009/00388* (2013.01); *G07C 2009/00412* (2013.01); *H04L 2012/40215* (2013.01); *H04L 2012/40273* (2013.01); *H04W 84/18* (2013.01)

(58) Field of Classification Search
CPC .......... G07C 2009/00404; G07C 2009/00412; G07C 2009/00507; G07C 2009/00555; B60R 25/24

See application file for complete search history.

(56) References Cited

U.S. PATENT DOCUMENTS

| | | |
|---|---|---|
| 4,250,358 A | 2/1981 | Gilbertson |
| 5,019,804 A | 3/1991 | Fraden |
| 5,229,648 A | 7/1993 | Sues et al. |
| 5,396,215 A | 3/1995 | Hinkle |
| 5,486,814 A | 1/1996 | Quinones |
| 5,552,773 A | 9/1996 | Kuhnert |
| 5,642,095 A | 6/1997 | Cook |
| 5,838,227 A | 11/1998 | Murray |
| 5,936,412 A | 8/1999 | Gershenfeld |
| 6,091,330 A | 7/2000 | Swan et al. |
| 6,140,935 A | 10/2000 | Hayton et al. |
| 6,144,112 A | 11/2000 | Gilmore |
| 6,150,928 A | 11/2000 | Murray |
| 6,329,913 B1 | 12/2001 | Shieh et al. |
| 6,450,845 B1 | 9/2002 | Snyder et al. |
| 6,476,708 B1 | 11/2002 | Johnson |
| 6,509,747 B2 | 1/2003 | Nagai et al. |
| 6,566,997 B1 | 5/2003 | Bradin |
| 6,603,388 B1* | 8/2003 | Perraud .............. G07C 9/00309 340/13.27 |
| 6,650,227 B1 | 11/2003 | Bradin |
| 6,661,115 B2 | 12/2003 | Lester |
| 6,801,134 B1* | 10/2004 | Juzswik .............. B60R 25/2072 307/10.2 |
| 6,825,765 B2 | 11/2004 | Stanley |
| 6,909,946 B1 | 6/2005 | Kabel |
| 7,081,028 B1 | 7/2006 | Crane |
| 7,201,619 B1 | 4/2007 | Viggiano |
| 7,355,518 B1 | 4/2008 | Staerzl |
| 9,047,494 B1 | 6/2015 | Smith |
| 2006/0028353 A1* | 2/2006 | Mueller .................. B60R 25/04 340/5.31 |
| 2012/0105198 A1* | 5/2012 | Nakashima ............. B60R 25/04 340/5.72 |
| 2016/0087554 A1 | 3/2016 | Nohra |
| 2017/0331846 A1* | 11/2017 | Hall ...................... H04W 12/12 |

OTHER PUBLICATIONS

Key Priorities for Sub GHz Wireless Deployments, Silicon Laboratories Inc., Austin, TX, retrieved Feb. 2, 2018.

* cited by examiner

SECURE KEY ACKNOWLEDGEMENT—FREQUENCY DILUTION

CROSS-REFERENCE TO RELATED APPLICATIONS

The present application is related to co-filed U.S. provisional patent application Ser. No. 62/629,225 entitled, "Secure Key Acknowledgement—Frequency Dilution;" U.S. provisional patent application Ser. No. 62/629,234 entitled, "System and Method for Wirelessly Linking Electronic Components and/or Sensors Using Sub-1 GHz Frequencies (700-1000 MHz) for Long Range, Robustness in Wet Environment and Highly Resistant to Wireless Noise," and U.S. provisional patent application Ser. No. 62/629,239 entitled, "A System and Method for Combining a Wireless Device, Such as a Key or Other Device with a Wireless Kill Switch." These related applications are incorporated herein by reference in their entirety.

FIELD

Embodiments of the invention relate to systems and methods pertaining to electronic key-based security systems. More particularly, an embodiment of the invention relates to systems and methods that employ electronics to provide a security measure for wireless key or similar systems, making a much higher threshold for hacking or unwanted access.

BACKGROUND

The following description includes information that may be useful in understanding embodiments of the invention. It is not an admission that any of the information provided herein is prior art or relevant to the presently claimed invention, or that any publication specifically or implicitly referenced is prior art.

Key systems, such as but not limited to, those used in motorized vehicles, marine applications and other systems are vulnerable to hacking/intrusion which in turn enables the intruder/unwanted individual to intrude, steal or tamper with the vehicle and or system.

Conventional electronic keying solutions typically transmit keying data on one or multiple predefined frequencies. This conventional approach allows a thief (with relative ease using cheap electronics) to "imitate" the transmitting key and retransmit the information such that the receiver mistakes the thief's fake key for the legitimate key. Accordingly, the receiver executes the instruction or action included in the thief's fake key.

Conventional security measures may also include code rollover, which means that a unique code must be sent from the key each time a new instruction is sent and if a previously used code is sent the receiver will not execute the received instruction. However, by utilizing modern equipment (such as an advanced receiver and/or transmitter) the code rollover technique can be easily circumvented by jamming the first communication from the key. This forces the key user to try one more time. The thief then also jams the second attempt while transmitting the data from the first attempt making the user's second attempt seemingly successful. The thief then stores the second attempted code, which now becomes a unique unused code the thief can use to execute a desired action such as, but not limited to, unlocking or starting a vehicle.

The popular press has included articles about this problem, such as "Radio Attack Lets Hackers Steal 24 Different Car Models" written by Andy Greenberg that appeared in Wired magazine on Mar. 21, 2016 (https://www.wired.com/2016/03/study-finds-24-car-models-open-unlocking-ignition-hack/ (last accessed Jan. 31, 2018)). The article states:

For years, car owners with keyless entry systems have reported thieves approaching their vehicles with mysterious devices and effortlessly opening them in seconds. After having his Prius burgled repeatedly outside his Los Angeles home, the New York Times' former tech columnist Nick Bilton came to the conclusion that the thieves must be amplifying the signal from the key fob in the house to trick his car's keyless entry system into thinking the key was in the thieves' hand. He eventually resorted to keeping his keys in the freezer.

Now a group of German vehicle security researchers has released new findings about the extent of that wireless key hack, and their work ought to convince hundreds of thousands of drivers to keep their car keys next to their Pudding Pops. The Munich-based automobile club ADAC late last week made public a study it had performed on dozens of cars to test a radio "amplification attack" that silently extends the range of unwitting drivers' wireless key fobs to open cars and even start their ignitions, as first reported by the German business magazine WirtschaftsWoche. The ADAC researchers say that 24 different vehicles from 19 different manufacturers were all vulnerable, allowing them to not only reliably unlock the target vehicles but also immediately drive them away.

"This clear vulnerability in [wireless] keys facilitates the work of thieves immensely," reads a post in German about the researchers' findings on the ADAC website. "The radio connection between keys and car can easily be extended over several hundred meters, regardless of whether the original key is, for example, at home or in the pocket of the owner."

That car key hack is far from new: Swiss researchers published a paper detailing a similar amplification attack as early as 2011. But the ADAC researchers say they can perform the attack far more cheaply than those predecessors, spending just $225 on their attack device compared with the multi-thousand-dollar software-defined radios used in the Swiss researchers' study. They've also tested a larger array of vehicles and, unlike the earlier study, released the specific makes and models of which vehicles were susceptible to the attack; they believe that hundreds of thousands of vehicles in driveways and parking lots today remain open to the wireless theft method.

The Vulnerable Makes and Models

Here's the full list of vulnerable vehicles from their findings, which focused on European models: the Audi A3, A4 and A6, BMW's 730d, Citroen's DS4 Cross-Back, Ford's Galaxy and Eco-Sport, Honda's HR-V, Hyundai's Santa Fe CRDi, KIA's Optima, Lexus's RX 450h, Mazda's CX-5, MINI's Clubman, Mitsubishi's Outlander, Nissan's Qashqai and Leaf, Opel's Ampera, Range Rover's Evoque, Renault's Traffic, Ssangyong's Tivoli XDi, Subaru's Levorg, Toyota's RAV4, and Volkswagen's Golf GTD and Touran 5T. Only the BMW i3 resisted the researchers' attack, though they were still able to start its ignition. And the researchers posit—but admit they didn't prove—that the same technique likely would work on other vehicles, including those more common in the United States, with some simple changes to the frequency of the equipment's radio communications.

The ADAC released a video that shows surveillance camera footage of a real-world theft that seemed to use the technique, as well as a demonstration by the group's own researchers.

How the Hack Works

The ADAC researchers pulled off the attack by building a pair of radio devices; one is meant to be held a few feet from the victim's car, while the other is placed near the victim's key fob. The first radio impersonates the car's key and pings the car's wireless entry system, triggering a signal from the vehicle that seeks a radio response from the key. Then that signal is relayed between the attackers' two radios as far as 300 feet, eliciting the correct response from the key, which is then transmitted back to the car to complete the "handshake." The full attack uses only a few cheap chips, batteries, a radio transmitter, and an antenna, the ADAC researchers say, though they hesitated to reveal the full technical setup for fear of enabling thieves to more easily replicate their work. "We do not want to publish an exact wiring diagram, for this would enable even young [students] to copy the devices," says ADAC researcher Arnulf Thiemel. As it is, he says, the devices are simple enough that "every second semester electronic student should be able to build such devices without any further technical instruction."

The Wireless Key Problem

Most remarkable, perhaps, is that five years after the Swiss researchers' paper on the amplification attacks, so many models of car still remain vulnerable to the technique. When WIRED contacted the Alliance of Auto Manufacturers, an industry group whose members include both European and American carmakers, a spokesperson said that the group was looking into the ADAC research but declined to comment for now. The VDA, a German automakers' group, downplayed the ADAC's findings in response to an inquiry from WirtschaftsWoche, pointing to decreasing numbers of car thefts in Germany and writing that "action taken by the automobile manufacturers to improve the protection against theft were and are very effective."

None of that is particularly comforting to the many millions of drivers with wireless key fobs. In fact, vulnerabilities in these systems seem to be piling up faster than they're being fixed. Last year researchers revealed that they'd cracked the encryption used by the chipmaker Megamos in several different makes of luxury car owned by Volkswagen. And at the Defcon security conference, hacker Samy Kamkar unveiled a tiny device he calls "RollJam," which can be planted on a car to intercept and replay the "rolling codes" vehicle locking system manufacturers developed to stay ahead of earlier replay attacks.

The ADAC researchers warn that there's no easy fix for the attack they've demonstrated. Yes, car owners can use Bilton's solution and store their keys in a freezer or other "faraday cage" designed to block the transmission of unwanted radio signals. But ADAC researcher Thiemel warns that it's difficult to know just how much metal shielding is necessary to block all forms of the amplification attacks. Far better, he says, would be for manufacturers to build defenses into their wireless key fobs, such as timing constraints that could catch the long-range attacks. "It is the duty of the manufacturer to fix the problem," Thiemel says. "Keyless locking systems have to provide equal security [to] normal keys." Until then, plenty of cautious car owners will no doubt be keeping their own key fobs well chilled.

Therefore, for the reasons discussed above, a need exists for more advanced keying solution that can perform an expanded set of tasks at an improved rate of performance over the devices found in the prior art.

SUMMARY OF THE INVENTION

Embodiments of the invention provide a system for securely establishing a connection between a key and a receiver associated with a vehicle, such as a motorized vehicle like an automobile, a boat or vessel, or a stationary object such as a house. The key establishes contact with the receiver by sending a radio transmission. Upon receipt of the incoming transmission from the key, the receiver responds with an encrypted message containing a list (or a pattern or map) of multiple (2 or more) frequencies for the key to use in future messages to demonstrate its legitimacy to the receiver. In response, the key transmits information on sequentially using the multiple frequencies in the list provided by the receiver in order to convince the receiver of the key's legitimacy. Once convinced of the key's legitimacy, then the receiver may engage certain actions based on information transmitted by the key, such as turning on ignition, starting an engine, and/or switching relays.

BRIEF DESCRIPTION OF THE DRAWINGS

Figures provided herein may or may not be provided to scale. The relative dimensions or proportions may vary. Embodiments of the invention may be sized to fit within a variety of devices and larger systems.

DETAILED DESCRIPTION OF AN EMBODIMENT OF THE INVENTION

Embodiments of the invention provide a system for securely establishing a connection between a key and a receiver within or connected to a vehicle, such as a car/motorized vehicle, a boat/vessel or even a stationary object such as a house. The key system establishes contact with the receiver by sending a radio transmission. Upon receipt of the incoming transmission from the key system, the receiver responds with an encrypted message containing a list (or pattern or map) of multiple frequencies (e.g., 2 or more). In response, the key system must transmit information on sequentially using the frequencies specified by the receiver in order for the key to convince the receiver of its legitimacy. Once convinced of the key's legitimacy, the receiver may engage certain actions based on information transmitted by the key, such as turning on ignition, starting an engine, and/or switching relays, according to an embodiment of the invention. Thus, the receiver effectively provides the key system with a unique ID badge that it must use in communications with the receiver to prove its authenticity, according to an embodiment of the invention.

Embodiments of the method disclosed herein may also be used in conjunction with additional security features such as, but not limited to, code rollover and/or time delay functionality to enable further differentiation between a signal which originates from a greater distance than a predetermined user distance.

Figure 1:
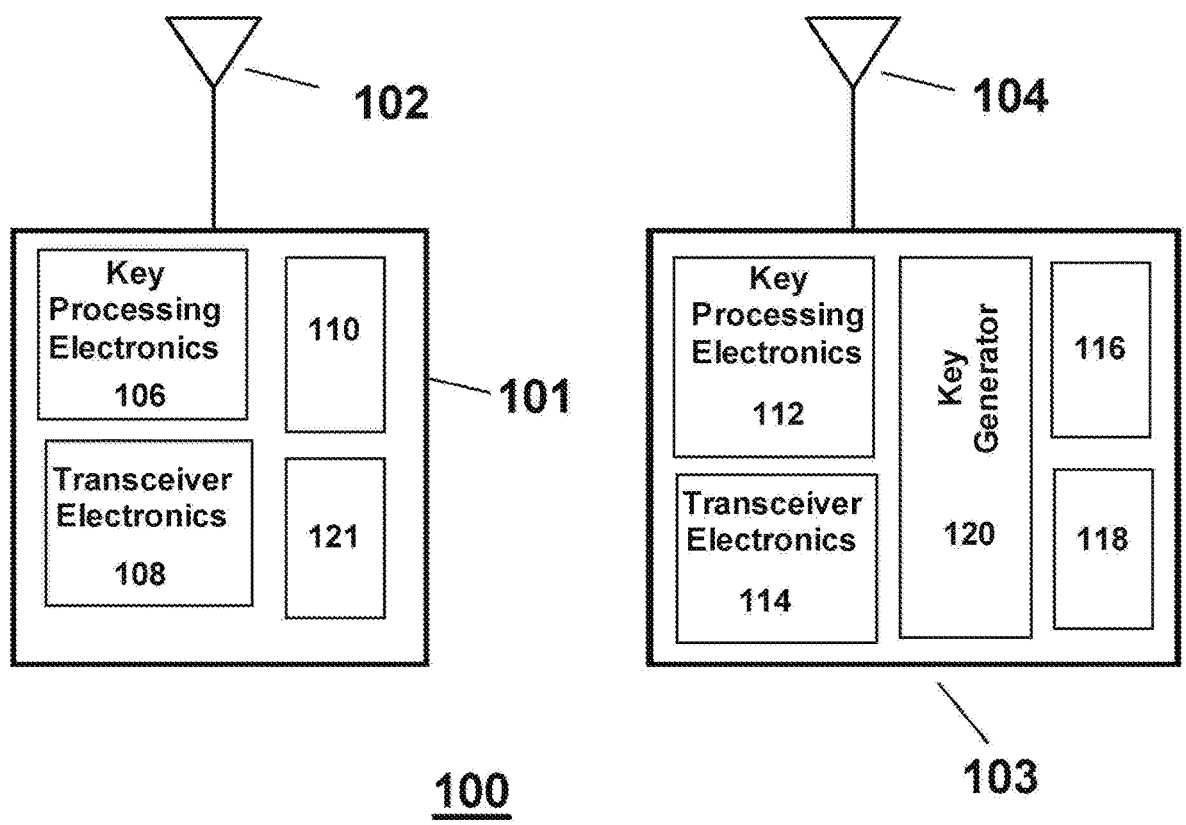
FIG. 01 illustrates a key transmitter device 101 in communication with a receiving unit 103, according to an embodiment of the invention.

FIG. 01 illustrates a key transmitter device 101 in communication with a receiving unit 103, according to an embodiment of the invention.

The key transmitter 101 includes an RF transceiver 102 that transmits data to and receives data from the receiving unit 103 via its RF transceiver 104. Communications between the transceiver 102 and the transceiver 104 are typically encrypted, according to an embodiment of the invention. The encrypted transmissions may employ AES128 encryption or even higher standards of encryption, according an embodiment of the invention.

The key transmitter 101 includes key processing electronics 106 configured to formulate a key for processing by the receiving unit 103 and transceiver electronics 108 capable of controlling the RF transceiver 102 to transmit the key and related data to the RF transceiver 104. The transceiver electronics 108 includes the circuitry necessary for encrypting messages to be sent via the transceiver 102, according to an embodiment of the invention. The transceiver electronics may include a CPU and/or electronics that carries out the logical operations described herein, according to an embodiment of the invention. The transceiver electronics 108 also generates a frequency map that is provided to the key transmitter 101, as described in FIG. 02.

The key transmitter 101 includes a key actuator 121, according to an embodiment of the invention. The key actuator 121 may comprise a button element whose physical actuation engages the key processing electronics 106. The key actuator 121 may also comprise a proximity sensor, a visual sensor, and/or a variety of automated engagement mechanisms, according to various embodiments of the invention. An embodiment including a proximity sensor may operate in conjunction with the transceiver 102.

The key transmitter 101 also includes a battery 110 suitable for providing electrical power to the key processing electronic circuitry 106, the transceiver processing electronic circuitry 108, and the transceiver 102. The key transmitter 101 may also include other components such as a device that provides tactile feedback to users, such as an LED display. The key transmitter 101 may also include a CAN bus interface that allows it to communicate data to other devices, according to an embodiment of the invention.

The receiving unit 103 includes transceiver electronics 114 configured to operate the RF transceiver 104 and configured to receive key data from the key transmitter 101. The transceiver electronics 114 includes the circuitry necessary for encrypting messages to be sent via the transceiver 104, according to an embodiment of the invention. The receiving unit 103 also includes key processing electronics 112 that include circuitry configure to analyze data received from the key transmitter 101 to determine the legitimacy of the key data. The receiving unit 103 may include a CPU or electronic circuitry that completes the logical operations described herein.

The receiving unit 103 further includes an actuator 118 configured to engage actions requested by the key unit transmitter 101 that the receiving unit's key processing electronics 112 have deigned legitimate. The key processing electronics 112 generates a clearance signal that may be provided to the actuator and to transceiver if the key transmitter is determined to be legitimate. The nature of the actuator 118 may vary from embodiment to embodiment depending on what actions the keys associated with the specific embodiment are intended to engage, e.g., turning on lights, turning off light, unlocking doors, locking doors, starting engines, turning off engines, etc. In many applications the actuator 118 may simply comprise a signal that engages a starter or completes a circuit. In some embodiments, the actuator 118 may even be configured to engage an action of some sort associated with the receiving unit 103 itself.

The receiving unit 103 further includes key generating electronic circuitry 120 configured to formulate communications to be sent to the key transmitter 101 via the transceiver 104, according to an embodiment of the invention. In some embodiments, the key generating electronic circuitry 120 may comprise an internal CPU configured to generate keys and communicate with the key transmitter 101 via the transceiver 104. In another embodiment of the invention, the key generating electronic circuitry 120 may include a second transceiver that only communicates certain kinds of highly encrypted keying data to the key transmitter 101.

The receiving unit 103 also includes a power supply 116, which may be a battery or some other source of electrical power, especially in embodiments where the receiving unit 103 is attached to a larger device such as a boat, a house, or an automobile. The receiving unit 103 may include other components, such as a device for conveying tactile information to a user, such as an LED. The receiving unit 103 may also include a CAN Bus interface that allows data to be provided to other (external) devices, according to an embodiment of the invention.

Figure 2:
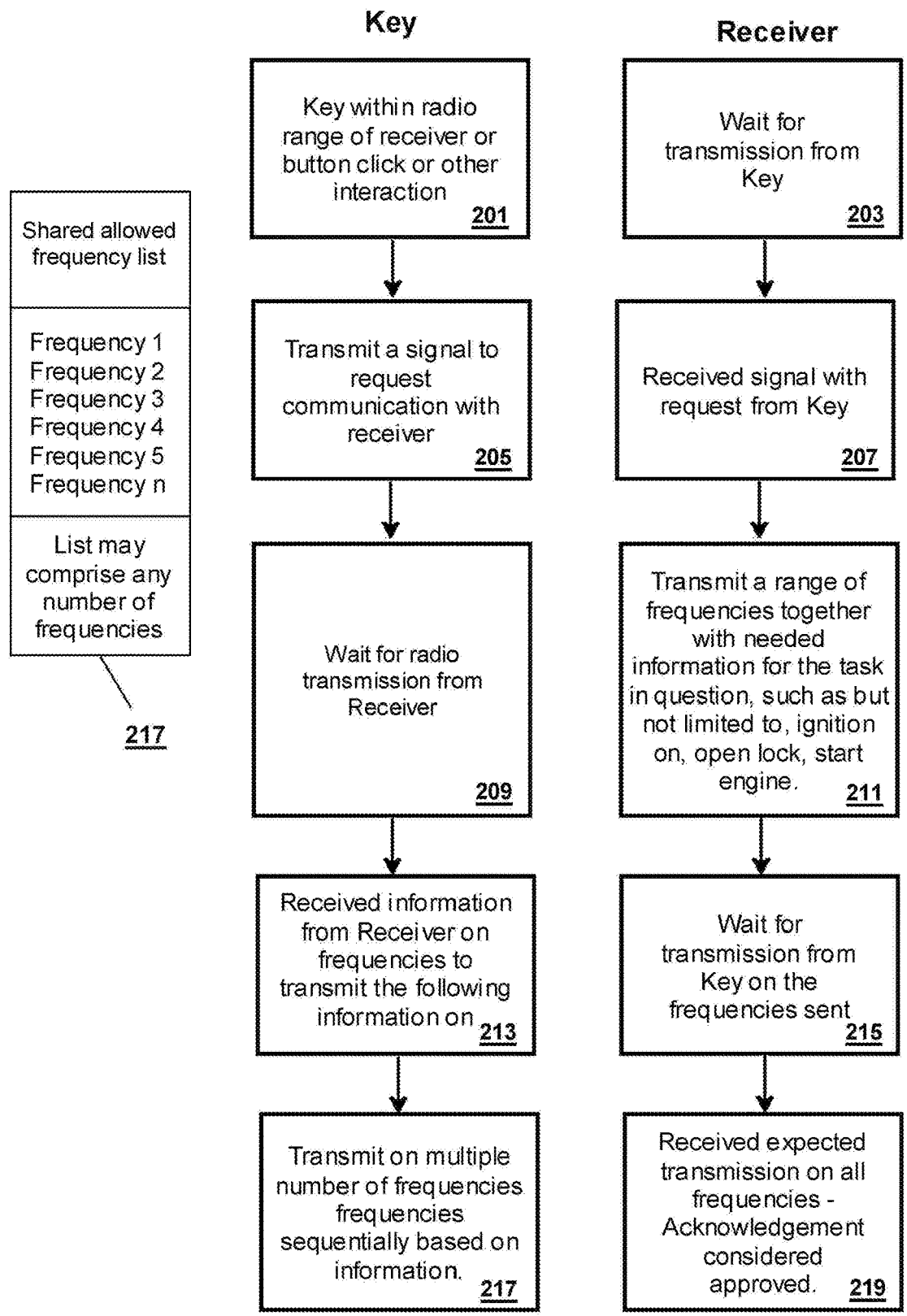
FIG. 02 illustrates a communications process between a key transmitter, such as the key transmitter 101 shown in FIG. 01, and a receiving unit, such as the receiving unit 103 shown in FIG. 01, according to an embodiment of the invention.

FIG. 02 illustrates a communications process between a key transmitter, such as the key transmitter 101 shown in FIG. 01, and a receiving unit, such as the receiving unit 103 shown in FIG. 01, according to an embodiment of the invention.

The key transmitter must be in communication range with the receiving unit (step 201). In other words, the transceiver 102 and the transceiver 104 shown in FIG. 01 are in communication range with each other. The key transmitter may explicitly determine that it is in communication range with a receiving unit, although this is not required for many embodiments of the invention.

In some embodiments of the invention, additional security may be added by requiring the key transmitter to be within a certain range of the receiver in order for the two devices to communicate. A wireless signal in a vacuum travels at the speed of light, which is 3.3 nanoseconds/meter. A wireless signal in air travels slightly slower. In some embodiments, the receiving unit may include a signal relay test capability that sends a message to the key transmitter, requesting an immediate reply. Accounting for the travel time of the initial signal, the time for the key transmitter to receive and formulate a replay, the travel time of the reply message, the receiving unit can determine (within an approximate range) an approximate distance between the key transmitter and the receiving unit. If the key transmitter lies outside an acceptable range (e.g., a few meters), then the receiving unit may reject further communications with the key transmitter under the assumption that the key transmitter is not legitimate, according to an embodiment of the invention. The circuitry for performing this check in the receiving unit 103 shown in FIG. 01 could be included in the key processing electronics 112 and transmitted via the transceiver 104. This embodiment provides heightened security for the receiving unit 103 at an expense of simplicity and overall communications speed, e.g., the key transmitter might actually be legitimate.

In any event, the key transmitter needs to be within communication range of a receiving unit in order for the two devices to communicate since the device's transceivers (e.g., the transceivers 102, 104 shown in FIG. 01) will likely not have an unlimited communication range. A variety of mechanisms may actuate the key transmission, such as a button click on the key transmitter. The key transmitter might also be engaged based on proximity sensing, visual sensing, and/or automated transmissions.

The receiving unit waits for transmission of a key from the key transmitter (step 203) when the receiving unit and key transmitter have not previously been in communication.

The key transmitter sends a signal to the receiving unit requesting communication (step 205), according to an embodiment of the invention.

The receiving unit receives the signal sent by the key transmitter containing the communication request from the key transmitter (step 207) and begins formulating a frequency map (step 211). In the meantime, the key transmitter waits (step 209) for an encrypted reply signal from the receiving unit.

The receiving unit transmits (step 211) an encrypted a list of frequencies to the key transmitter. The receiving unit's encrypted frequency list may possibly include other information needed for one or more tasks that the key unit could request from the receiving unit. The receiving unit's transmission of the frequency and task or data list may be communicated between the receiving unit and the key transmitter at a high level of encryption, such as AES128 or stronger, according to an embodiment of the invention. Both the key transmitter and the receiving unit are configured to send encrypted communications to each other, according to an embodiment of the invention.

The list transmitted by the receiving unit in step 211 may effectively communicate information such as shown in the table below:

| Frequency | Transmission |
|---|---|
| 820.1 | Transmission Data 1 |
| 910.4 | Transmission Data 2 |
| 853.6 | Transmission Data 3 |
| 903.5 | Transmission Data 4 |

This list provides a communication key for the key transmitter (e.g., the transceiver electronics in the key transmitter), according to an embodiment of the invention. Thus, in future communications from the key transmitter to the receiving unit, the key transmitter will send data messages on all the designated frequencies included in the encrypted frequency map (or list) received from the receiving unit before the key system is trusted by the receiver. This list essentially provides the key transmitter with an identification badge for future communications. The specific request from the key transmitter to the receiving unit to perform an action may be included in one or more of the messages, according to an embodiment of the invention.

Once the receiving unit has sent its frequency map (or list), then the receiving unit will respond to appropriate messages from the key transmitter sent on the frequencies transmitted in the list. The actions (e.g., unlock door) instructed by the key transmitter to the receiving unit can be predefined, according to an embodiment of the invention. In another embodiment of the invention, the acceptable actions that can be undertaken by the receiving may also be included in the encoded frequency map sent by the receiving unit to the key transmitter. In essence, the receiving unit responds to the initial event from the key transmitter with a list of random frequencies and data (which can be garbage) generated by the receiving unit which the key transmitter is to send in rapid succession on each of these frequencies just to verify that it is in fact the correct key in place and not a hacker, according to an embodiment of the invention.

In some embodiments of the invention, the list transmitted by the receiving unit may also instruct the key transmitter regarding how to compose future messages, such as shown below.

The list transmitted by the receiving unit may effectively communicate information such as shown in the table below:

| Frequency | Transmission |
|---|---|
| 820.1 | Dummy |
| 910.4 | Payload |
| 853.6 | Dummy |
| 903.5 | Dummy |

Thus, in such a transmission, the receiving unit instructs the key transmitter that future messages must not only be sent on all the listed frequencies to be acted upon but that the receiving unit will only take action upon instructions provided in the transmissions corresponding to one particular frequency, according to an embodiment of the invention.

In yet another embodiment of the invention, the receiving unit may provide the key transmitter with specific frequencies for specific actions, such as those provided in this table:

| Frequency | Task |
|---|---|
| 906.8 | Dummy code |
| 820.1 | Engine Ignition |
| 910.4 | Engine shut off |
| 853.6 | Lock doors |
| 903.5 | Unlock doors |

Thus, the key transmitter knows that it must not only transmit a message on all the listed frequencies but that it should include the "dummy code" in all the transmissions but for the one that it wants acted upon, e.g., if the key transmitter wants to lock the doors, then only the message sent at frequency 853.6 will not contain the dummy code, according to an embodiment of the invention.

The key transmitter receives the encrypted information from the receiving unit (step 213) containing the receiving unit's task related information and the relevant frequencies information. The key transmitter decrypts the frequency information provided by the receiving unit. The key transmitter may employ its key processing electronics, such as the key processing electronic 106 shown in FIG. 01, to decrypt the message from the receiving unit. The receiving unit (step 215) meanwhile waits for the key transmitter to send a follow-up message on the frequencies sent by the receiving unit to the key transmitter.

The key transmitter transmits (step 217) its keying data on multiple frequencies sequentially based on the information provided by the receiving unit in its earlier communication response (step 211), according to an embodiment of the invention. The keying data is formulated by the key processing electronics, such as the key processing electronics 106 shown in FIG. 01.

The receiving unit may receive (step 219) communications from the key transmitter on all requested frequencies.

If the communications are received in accordance with the earlier transmission from the receiving unit (step 211), then the receiving unit may engage execution of the keying instruction included in the message from the key transmitter, according to an embodiment of the message. In other words, using one of the tables above, if the key transmitter sends data successively on all the listed frequencies, then the receiving will engage the specified action. Otherwise, no action will be taken, according to an embodiment of the invention.

In some embodiments of the invention, as discussed above, the key transmitter may also need to communicate other information in addition to a range of frequencies in order for the receiving unit to act on the key unit's instructions, e.g., in some embodiments of the invention, if the key transmitter wants to lock doors, then the receiving unit will initiate engagement of this instruction only if it is received on a particular frequency and no other.

The key transmitter may also need to send the messages within a time limit set to verify that the key transmitter is within an acceptable range, as discussed above, according to an embodiment of the invention.

As shown in FIG. 02, the allowed frequencies list may include a number of frequencies required for successful communication. The range of possibly allowed frequencies may be controlled by factors such as regulations related to particular communication bands for the type of transceivers (e.g., transceivers 102, 104 shown in FIG. 01) used by the key transmitter and the receiving unit.

The receiving unit's encrypted message to the key transmitter may include additional information regarding a duration for the information transmitted. The duration may be controlled by the number of transmissions (e.g., every 10 transmissions) and/or a specific time limit (e.g., 45 minutes) where the receiving unit and the key transmitter have access to time-keeping devices, according to an embodiment of the invention. In such embodiments, once the duration has expired, then the key transmitter will need to request a new list of acceptable frequencies from the receiving unit in order for the two devices to continue communicating.

Various embodiments of the invention have been described in detail with reference to the accompanying drawings. References made to particular examples and implementations are for illustrative purposes, and are not intended to limit the scope of the invention or the claims.

It should be apparent to those skilled in the art that many more modifications of the invention besides those already described are possible without departing from the inventive concepts herein. The inventive subject matter, therefore, is not to be restricted except by the scope of the appended claims. Moreover, in interpreting both the specification and the claims, all terms should be interpreted in the broadest possible manner consistent with the context.

Headings and sub-headings provided herein have been provided as an assistance to the reader and are not meant to limit the scope of the invention disclosed herein. Headings and sub-headings are not intended to be the sole or exclusive location for the discussion of a particular topic.

While specific embodiments of the invention have been illustrated and described, it will be clear that the invention is not limited to these embodiments only. Embodiments of the invention discussed herein may have generally implied the use of materials from certain named equipment manufacturers; however, the invention may be adapted for use with equipment from other sources and manufacturers. Equipment used in conjunction with the invention may be configured to operate according to conventional protocols (e.g., Wi-Fi) and/or may be configured to operate according to specialized protocols. Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification, but should be construed to include all systems and methods that operate under the claims set forth hereinbelow. Thus, it is intended that the invention covers the modifications and variations of this invention provided they come within the scope of the appended claims and their equivalents.

It should be noted that while many embodiments of the invention described herein are drawn to a smart wireless invention, various configurations are deemed suitable and may employ various computing devices including servers, interfaces, systems, databases, agents, engines, controllers, or other types of computing devices operating individually or collectively. One should appreciate that any referenced computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed smart invention.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. The terms "coupled to" and "coupled with" are also used euphemistically to mean "communicatively coupled with" where two or more networked devices are able to send or receive data over a network.

We claim:

1. A wireless key transmission system, comprising:
   a receiving unit, comprising:
   a transceiver that transmits and receives encrypted data from a key transmitter, wherein data includes communication requests and a plurality of keys from the key transmitter;
   key processing electronics configured to analyze data received from the key transmitter to determine the legitimacy of the received data from the key transmitter and generate a clearance signal if the received key data is legitimate;
   transceiver electronics configured to operate the transceiver and configured to receive data from the key transmitter, wherein the transceiver electronics generates a frequency map for transmission to the key transmitter after receipt of a clearance signal from the key processing electronics for received data related to a communication request; and
   an actuator configured to engage an action of a plurality of actions requested by a key of the plurality of keys after the key processing electronics have generated a clearance signal for the key of the plurality of keys; and a key transmitter, comprising:
a transceiver that transmits and receives encrypted data from the receiving unit;
transceiver electronics configured to control operation of the transceiver, wherein the transceiver electronics receives the frequency map from the receiving unit and uses the frequency map to communicate keys of the plurality of keys to the receiving unit; and
key processing electronics configured to formulate a plurality of keys for processing by the receiving unit, wherein each key corresponds to an action engageable by the actuator.

2. The wireless key transmission system of claim 1 wherein the transceiver electronics generates the frequency map as a random selection of frequencies within a given frequency band.

3. The wireless key transmission system of claim 1 wherein each frequency in the frequency map corresponds to an action of the plurality of actions.

4. The wireless key transmission system of claim 1 wherein the key processing electronics in the receiving unit comprises a CPU.

5. The wireless key transmission system of claim 1 wherein the key transmitter includes a second transceiver that communicates keys of the plurality of keys to the receiving unit.

6. The wireless key transmission system of claim 1 wherein the receiving unit is located within a vehicle.

7. The wireless key transmission system of claim 6 wherein an action of the plurality of actions comprises a request to the actuator to engage a motor on the vehicle and wherein the actuator engages the motor.

8. The wireless key transmission system of claim 1 wherein the transceiver on the receiving unit and the transceiver on the key transmitter employs AES128 encryption.

9. The wireless key transmission system of claim 1 further comprising a CPU in the transceiver electronics of the key transmitter.

10. The wireless key transmission system of claim 1 wherein the key transmitter further comprises:
a key actuator whose physical actuation engages the key processing electronics.

11. The wireless key transmission system of claim 10 wherein the key actuator comprises at least one of a button, a proximity Sensor, a visual Sensor, and an automated engagement device.

12. The wireless key transmission system of claim 1 further comprising a battery that provides power to the key processing electronic circuitry.

13. The wireless key transmission system of claim 1 wherein the transceiver electronics in the receiving unit includes the circuitry that encrypts messages to be sent via the transceiver.

14. The wireless key transmission system of claim 1 wherein the actuator in the receiving unit engages at least one of turning on lights, turning off light, unlocking doors, locking doors, starting engines, turning off engines, and engages a starter or completes a circuit.

15. The wireless key transmission system of claim 1 wherein the receiving unit further comprises a CAN Bus interface that transmits data to external devices.

16. A wireless key transmission system, comprising:
a receiver configured to receive a communication request from a key system, generate a random list of frequencies, encrypt the frequency list, and transmit a message to the key system that includes the encrypted frequency list; and
a key system configured to send the communication request and send the communication request to the receiver, receive from the receiver the message comprising the encrypted frequencies list, decrypt the encrypted frequencies list, prepare an action message for transmission to the receiving unit, and transmit the action message along with a verification message on each of the frequencies included in the encrypted frequencies list,
wherein the receiver engages an action specified in the action message after it has verified that the key system has sent verification messages on each of the frequencies included in the encrypted frequencies list.

* * * * *